United States Patent Office 3,133,095
Patented May 12, 1964

3,133,095
STABLE LEAD ALKYL COMPOSITIONS AND A METHOD FOR PREPARING THE SAME
Wilford H. Thomas and Shirl E. Cook, Baton Rouge, La., assignors to Ethyl Corporation, New York, N.Y., a corporation of Virginia
No Drawing. Filed June 8, 1962, Ser. No. 200,927
10 Claims. (Cl. 260—437)

This invention relates to alkyllead compositions which are stable at temperatures above 100° C. It also relates to methods for inhibiting the thermal decomposition of alkyllead compounds when subjected to temperatures above 100° C., at which temperature thermal decomposition becomes appreciable.

Generally this invention contemplates inhibiting the thermal decomposition of alkyllead compounds in which at least one valence of the lead is satisfied by an alkyl radical.

More specifically, this invention is concerned with an improved process for separating alkyllead compounds from the reaction products accompanying their synthesis. It is also applicable to a method for inhibiting thermal decomposition of an alkyllead product during its purification and blending with other products in making commercial antiknock fluids. It is applicable to minimizing the possibility of thermal decomposition during storage or transportation of an alkyllead product. It is especially applicable to preventing thermal decomposition of undiluted alkyllead compounds where the likelihood of thermal decomposition is more of a problem.

As is well known, tetraalkyllead antiknock compounds generally are produced by reacting a sodium-lead alloy with an alkyl halide. Due to recent marked improvements in the technology of alkyllead manufacture, thermal instability of alkyllead compounds during synthesis is no longer a problem. However, the tetraalkyllead compound so produced is in admixture with various reaction by-products from which it must be separated. Separation is effected by steam or vacuum distillation with subsequent purification of the tetraalkyllead distillate. Due to the toxic and unstable nature of tetraalkyllead antiknock compounds, these distillation and purification operations are subject to many difficulties.

In these distillation and purification operations meticulous temperature control and exact safety measures are of paramount importance. The rate of decomposition of the alkyllead compound increases rapidly with small rises in temperature above the temperature where thermal decomposition becomes appreciable. For example, decomposition of tetraethyllead occurs at the rate of approximately 2 percent per hour at a temperature of 100° C., which is the customary temperature used in separating tetraethyllead from the reaction products accompanying its synthesis. At temperatures above 100° C., the decomposition rate increases logarithmically so that a point is soon reached where external heat is no longer required and decomposition becomes self-propagating.

Such likelihood of excessive decomposition is present also during blending, handling, storage, and transportation. Prior to diluting the alkyllead concentrate with scavengers, gasoline or other materials, the alkyllead compound remains a concentrate and the problem of excessive thermal decomposition exists, even though the temperature is maintained normally well below that of decomposition. For example, in the purification step wherein the tetraethyllead concentrate is washed and blown with air at atmospheric temperature to remove impurities, a sudden increase in temperature may occur due to the oxidation of triethylbismuth which is present as an impurity. Also pumps used in handling tetraethyllead occasionally "freeze" and the friction developed may cause a local overheating to a temperature above the temperature of decomposition of the tetraethyllead. Faulty wiring, leaks onto steam pipes, and other accidental causes also may produce local overheating with resulting dangerous decomposition.

It is seen therefore that in those operations where an alkyllead compound is in the undiluted or concentrated state—viz. separation, purification, blending, transportation, and storage—the likelihood of excessive thermal decomposition must be provided for and effectively combatted.

An object of this invention is to stabilize alkyllead compounds against thermal decomposition during one or more of the following operations: separation, purification, blending, transportation and storage.

The above and other objects of this invention are accomplished by incorporating with alkyllead compounds a relatively small quantity of a mixture of materials which has the property of synergistically inhibiting alkyllead thermal decomposition. The foregoing objects are also accomplished by conducting one or more of the foregoing operations in the presence of such a mixture of materials. The mixtures which have been found to possess these unexpected properties are referred to hereinafter as "thermal stabilizers."

The synergistic thermal stabilizer mixtures of this invention are composed of ethylene dibromide associated with furfural or furfuryl alcohol, or both of these furfuryl compounds. The concentrations in which these ingredients are used are equivalent to from about 0.05 to about 0.5 mole of ethylene dibromide per mole of alkyllead compound, and from about 0.05 to about 30 percent by weight of furfural or furfuryl alcohol, or both, based on the weight of the alkyllead compound. Particularly, effective synergistic thermal stabilizing effectiveness is achieved when these ingredients are used in the preferred concentration ranges of from about 0.05 to about 0.4 mole of ethylene dibromide per mole of alkyllead compound and from about 0.5 to about 20 weight percent of the furfural, furfuryl alcohol, or both, based on the weight of the alkyllead compound. This mixture of thermal stabilizers when used in the foregoing amounts are particularly effective in substantially retarding or preventing thermal decomposition of the alkyllead compounds at temperatures ranging from about 100° C. up to 195° C. for extended periods of time.

The chief thermal decomposition products of alkyllead compounds are lead metal and hydrocarbon gas. Hence, a very good index of alkyllead thermal decomposition is liberation of this gas.

To illustrate the effectiveness of this invention, a series of direct comparisons were made of the decomposition characteristics of unstabilized and stabilized tetraethyllead samples. A thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to a steady temperature of 195° C., the sample-containing tube was quickly immersed in the bath and clamped with the levelling bottle adjusted to hold the gas buret in place at a zero reading. Then measured was the time during which the sample was held at 195° C. without pronounced thermal decomposition and consequent gas evolution occurring. Thus, the longer the time, the more thermally stable was the alkyllead composition.

With pure tetraethyllead used in 1 ml. amounts, pronounced thermal deterioration occurred almost immediately as evidenced by rapid gas evolution. In fact, the decomposition of unstabilized tetraethyllead will normally become uncontrollable if it is heated, whether rapidly or slowly, to even 130° C., unless it is possible to very rapidly cool it down to about 100° C. or below.

The remainder of the compositions treated in the manner described above and the results thereby obtained are shown in the following tables.

TABLE I

*Effect of Additives on Thermal Decomposition of Alkyllead Compounds at 195° C.*

| No. | Ethylene Dibromide, Mole/Mole TEL | Furfural, Wt. Percent of TEL | Thermal Stability Time to Decomposition, Minutes |
|---|---|---|---|
| (Composition of this invention) | | | |
| 1 | ¹ 0.05 | 15 | 227 |
| (Compositions not of this invention) | | | |
| 2 | nil | 15 | 199 |
| 3 | ¹ 0.05 | nil | <1 |
| 4 | 0.1 | nil | 3 |

¹ 0.05 mole of ethylene dichloride was copresent.

TABLE II

*Effect of Additives on Thermal Decomposition of Alkyllead Compounds at 195° C.*

| No. | Ethylene Dibromide, Mole/Mole TEL | Furfuryl Alcohol, Wt. Percent of TEL | Thermal Stability Time to Decomposition, Minutes |
|---|---|---|---|
| (Composition of this invention) | | | |
| 1 | 0.05 | 1 | 15 |
| (Compositions not of this invention) | | | |
| 2 | nil | 1 | 6 |
| 3 | 0.05 | nil | <1 |
| 4 | 0.1 | nil | 3 |

It will be noted that the compositions of this invention exhibited a high degree of synergistic effectiveness.

The above-described beneficial behavior of the thermal stabilizer mixtures of this invention also takes place with other alkyllead compounds such as triethyllead bromide and tetrapropyllead. In fact, these compounds when stabilized can be boiled and distilled at atmospheric pressure.

This invention is adapted to the stabilization of tetraethyllead and other alkyllead compounds at various stages after they have been formed and the diluents or excess alkyl halide have been discharged from the autoclave. For example, one of the above thermal stabilizer combinations may be added in appropriate quantity to the alkyllead reaction concentrate just before the separation step which is conducted at a temperature close to the temperature where hazardous run-away decomposition is particularly prevalent. By adding one of the above thermal stabilizer combinations to the reaction concentrate just prior to distillation, the danger arising from unexpected temperature increases is substantially eliminated.

Most preferably the above thermal stabilizer combinations are employed to stabilize the alkyllead compound both in storage and in shipping and especially to stabilize any alkyllead concentrate, i.e., compositions containing at least 80 percent by weight of alkyllead compound. If elevated temperature conditions are likely to be encountered, the addition of a small amount of thermal stabilizer mixture to the alkyllead compound will economically and satisfactorily eliminate most of the hazard involved.

While meticulous temperature control and exacting safety measures have been successful in reducing to a minimum the hazards of processing and handling of tetraethyllead, the use of this invention provides a much greater factor of safety. Furthermore, waste of the alkyllead product due to decomposition is considerably minimized through the use of this invention.

This invention is useful in stabilizing alkyllead compounds in which at least one valence of the lead is satisfied by an alkyl radical. For example tetraethyllead, tetramethyllead, tetrapropyllead, dimethyldiethyllead, triethylphenyllead, and triethyllead bromide can be successfully stabilized against thermal decomposition by incorporating therein a relatively small quantity of one of the thermal stabilizers of this invention. This invention is particularly well suited to the stabilization of any mixture involving two or more of the following compounds: tetramethyllead, ethyltrimethyllead, diethyldimethyllead, triethylmethyllead, and tetraethyllead.

While this invention has been discussed with reference to the use of either furfural or furfuryl alcohol or any mixture of the two, it will be understood that generally equivalent results are achieved when either or both of these compounds are substituted on the ring by alkyl or alkenyl groups. Thus, generally equivalent results are achieved by the utilization of such compounds as 5-methylfurfural, 3,5-dimethylfurfural, 5-ethylfurfural, 4-butylfurfural, 5-methylfurfuryl alcohol, 4,5 - dimethylfurfuryl alcohol, 5-isopropylfurfuryl alcohol, 4-allylfurfural, 5-propenylfurfuryl alcohol and similar compounds in which the furfuryl ring is substituted with up to 3 alkyl and/or alkenyl groups which preferably contain up to about 6 carbon atoms each. Consequently, such closely related compounds fall within the ambit and scope of the present invention even though generally speaking their use is somewhat less preferable simply because these compounds are somewhat less available and somewhat more expensive than either furfural or furfuryl alcohol.

What is claimed is:

1. A method of inhibiting the decomposition of an alkyllead compound at temperatures of from about 100° C. to about 195° C. which comprises incorporating with said compound from about 0.05 to about 0.5 mole of ethylene dibromide per mole of said compound, and from about 0.05 to about 30 percent based on the weight of said alkyllead compound of a furfuryl compound selected from the group consisting of furfural, furfuryl alcohol, and mixtures thereof.

2. The method of claim 1 wherein said furfuryl compound is furfural.

3. The method of claim 1 wherein said furfuryl compound is furfuryl alcohol.

4. In the process of producing an alkyllead compound by reacting a sodium lead alloy with alkyl chloride and separating the thus produced alkyllead compound from the reaction mass by steam distillation, the step which comprises conducting said steam distillation in the presence of from about 0.05 to about 0.5 mole of ethylene dibromide per mole of said compund, and from about 0.05 to about 30 percent based on the weight of said alkyllead compound of a furfuryl compound selected from the group consisting of furfural, furfuryl alcohol and mixtures thereof.

5. A concentrated alkyllead compound with which has been blended from about 0.05 to about 0.5 mole of ethylene dibromide per mole of said compound and from about 0.5 to about 30 percent based on the weight of said alkyllead compound of a furfuryl compound selected from the group consisting of furfural, furfuryl alcohol, and mixtures thereof.

6. The composition of claim 5 wherein the concentration of said furfuryl compound is from about 0.5 to about 20 percent based on the weight of said alkyllead compound.

7. The composition of claim 5 wherein the concentration of the ethylene dibromide is from about 0.05 to about 0.4 mole per mole of said alkyllead compound, and wherein the concentration of said furfuryl compound is from about 0.5 to about 20 percent based on the weight of said alkyllead compound.

8. The composition of claim 5 wherein said compound is selected from the group consisting of tetramethyllead, ethyltrimethyllead, diethyldimethyllead, triethylmethyllead, tetraethyllead, and mixtures thereof.

9. A concentrated alkyllead compound with which has been blended about 0.05 mole of ethylene dibromide per mole of said compound and about 15 percent based on the weight of said alkyllead compound of furfural.

10. A concentrated alkyllead compound with which has been blended about 0.05 mole of ethylene dibromide per mole of said compound and about 1 percent based on the weight of said alkyllead compound of furfuryl alcohol.

References Cited in the file of this patent
UNITED STATES PATENTS

| | | |
|---|---|---|
| 2,660,591 | Calingaert | Nov. 24, 1953 |
| 2,836,568 | Ecke et al. | May 27, 1958 |
| 3,021,350 | Cook et al. | Feb. 13, 1962 |